United States Patent [19]

Matsusaka et al.

[11] Patent Number: 5,727,103
[45] Date of Patent: Mar. 10, 1998

[54] OPTICAL LEAKAGE PREVENTING APPARATUS AND SELF-LIGHT-EMITTING INDICATING APPARATUS USING THE SAME

[75] Inventors: Yoshiharu Matsusaka, Osaka; Kunio Okamoto, Hyogo, both of Japan

[73] Assignee: Sanyo Electric Co., Ltd., Moriguchi, Japan

[21] Appl. No.: 773,590

[22] Filed: Dec. 27, 1996

Related U.S. Application Data

[63] Continuation of Ser. No. 336,211, Nov. 4, 1994, abandoned.

[30] Foreign Application Priority Data

| Nov. 9, 1993 | [JP] | Japan | 5-279930 |
| Jun. 17, 1994 | [JP] | Japan | 6-136186 |
| Sep. 30, 1994 | [JP] | Japan | 6-261616 |
| Oct. 17, 1994 | [JP] | Japan | 6-250811 |
| Oct. 19, 1994 | [JP] | Japan | 6-253939 |

[51] Int. Cl.⁶ ............................. G02B 6/36
[52] U.S. Cl. ............................. 385/89; 385/901
[58] Field of Search .................. 362/32; 385/901, 385/89

[56] References Cited

U.S. PATENT DOCUMENTS

| 4,917,448 | 4/1990 | Oppenheimer | 362/32 |
| 4,922,384 | 5/1990 | Torrence | 362/32 |
| 5,040,320 | 8/1991 | Reidinger | 362/32 |
| 5,066,947 | 11/1991 | Du Castel | 340/815.31 |
| 5,103,581 | 4/1992 | Novak | 362/32 |
| 5,151,679 | 9/1992 | Dimmick | 362/32 |
| 5,193,893 | 3/1993 | Mitko | 362/32 |
| 5,295,221 | 3/1994 | Roslan | 362/32 |

FOREIGN PATENT DOCUMENTS

| 0 401 175 | 5/1990 | European Pat. Off. . |
| 0 422 777 | 9/1990 | European Pat. Off. . |
| 0 467 034 | 1/1992 | European Pat. Off. . |
| 0544149 A1 | 6/1993 | European Pat. Off. . |
| 0562873 A1 | 9/1993 | European Pat. Off. . |
| 63-205689 | 8/1988 | Japan . |
| 1309305 | 3/1973 | United Kingdom . |
| 1374995 | 11/1974 | United Kingdom . |
| 1481334 | 7/1977 | United Kingdom . |
| 2003294 | 3/1979 | United Kingdom . |
| 1203010 | 8/1979 | United Kingdom . |
| 2201023 | 8/1988 | United Kingdom . |

OTHER PUBLICATIONS

Patent Abstracts of Japan, Section E:E621, vol. 12, No. 207, p. 80; Japan Patent No. 63-5579 (A), published Jan. 11, 1988.
PCT application No. WO 92/21997, published Dec. 10, 1992.

*Primary Examiner*—Rodney B. Bovernick
*Assistant Examiner*—Robert E. Wise
*Attorney, Agent, or Firm*—Armstrong, Westerman, Hattori, McLeland & Naughton

[57] ABSTRACT

A self-light-emitting indicating apparatus including an enclosure formed by combining a pair of opposing semi-tubular bodies, each having first and second support members positioned at both ends; first and second panels fixed on the first and second support members respectively, at least one of the first and second panels having a plurality of through-holes and/or having a sign indicating portion; a plurality of optical fibers contained in a container portion defined by the enclosure and the first and second panels, each having one end inserted and fixed in one of the plurality of through-holes provided in at least one of the first and second panels, and a light emitting diode contained in the container portion, arranged adjacent to the other end of the plurality of optical fibers which are bundled and cut, and having an optical leakage preventing means. When the light from the emitting diode is to be transmitted to the adjacent number of optical fibers, optical loss can be suppressed by the optical leakage preventing means, and in addition, light points at the rear ends of the optical fibers can be arranged along the periphery of the existing sign board, so that existence of a fire hydrant is made readily visible.

24 Claims, 18 Drawing Sheets

FIG. 19A
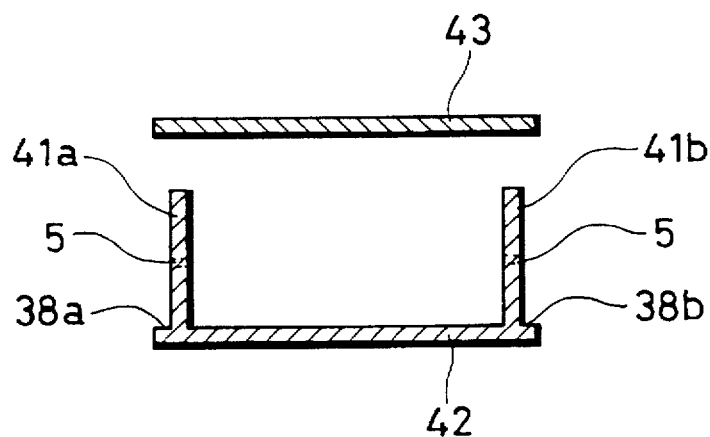
FIG. 19B
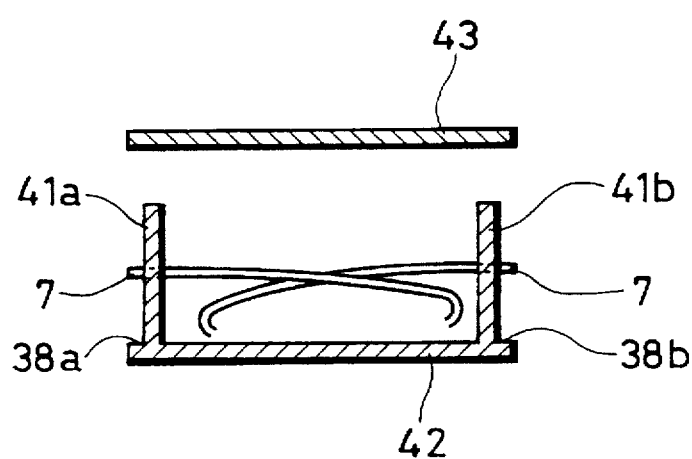
FIG. 19C
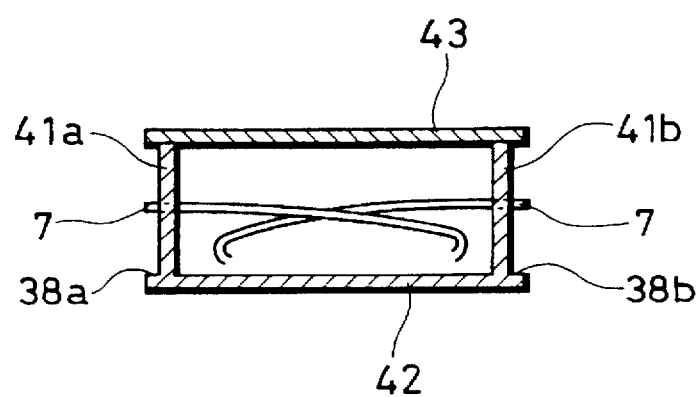

OPTICAL LEAKAGE PREVENTING APPARATUS AND SELF-LIGHT-EMITTING INDICATING APPARATUS USING THE SAME

This application is a continuation of application Ser. No. 08/336,211, filed Nov. 4, 1994, now abandoned.

BACKGROUND OF THE INVENTION

1. Field of the Invention

The present invention relates to an optical leakage preventing apparatus for connection between an optical fiber and a light emitting diode, and to a self light-emitting indicating apparatus using the same. More specifically, the present invention provides an apparatus for preventing leakage of light for connection between the optical fiber and the light emitting diode which is suitable when a light emitting diode is used as a light source, one end of an optical fiber is placed near the light emitting diode, and the light of the light emitting diode is transmitted to the lighting point at the other end of the optical fiber. More specifically, it provides a technique for reducing optical loss at the connection between the optical fiber and the light emitting diode. The self-light-emitting indicating apparatus relates to an apparatus using a light emitting diode as a light source, and using an optical fiber for transmitting light from the light emitting diode to the lighting point on an indication portion. The present invention also provides a technique for making thinner the structure of the self-light-emitting indicating apparatus by making smaller the curvature of bending the optical fiber to narrow the distance between holding plates such as panels or support members holding the optical fiber. Though a commercial AC power source can be used as a power supply for the light emitting diode, the present invention provides a self-light-emitting indicating apparatus to which a solar cell is suitably used as a power source for the light emitting diode.

2. Background of the Invention

Generally, in fire preventing operation, whether or not the initial operation can be started quickly is of critical importance for successful fire fighting. Therefore, it is very important to guide fire fighters quickly and accurately to a fire hydrant under poor visibility at night. Recently, as the number of automobiles has been increased while the parking lot is not sufficient, it is often the case that even when a fire hydrant could be found quickly, there is a car parked blocking the hydrant. Therefore, it is also important to attract attention of the drivers so that the drivers park their cars away from the fire hydrant or outside the path to the fire hydrant.

Conventionally, in most cases, a sign including a fire hydrant is not provided with any illumination at all, and therefore it is difficult for the fire fighters to find a fire hydrant under poor visibility at night.

Conventionally, for illumination of road signs (such as STOP, NO ENTRY, NO LEFT-TURN, NO-RIGHT TURN, NO PARKING and so on) and common advertizing sign boards, indications are given by incandescent lamps, fluorescent lamps, neon lamps or a number of light emitting diodes (LEDs). However, these indications require much power. If a commercial AC power source is readily available, power may be supplied to the incandescent lamps, fluorescent lamps, neon lamps or LEDs from that power supply. However, in a solitary island or in developing countries where commercial AC power supply is not available, it is necessary to install a compact power generating equipment if a road sign or an advertizing sign board is to be provided at a location where such sign is necessary, which leads to considerable cost.

In order to solve such a problem, Japanese Patent Laying-Open No. 63-205689 proposes a technique for a sign indication employing a light emitting diode and optical fibers. In such a prior art technique, at a connection between the light emitting diode and the optical fiber, the light from the light emitting diode leaks to portions other than the edges of a plurality of optical fiber bundles opposing the diode, resulting in optical loss. When the edges of the plurality of optical fiber bundles are directly brought into contact with an end surface of the light emitting diode so as to suppress optical loss as much as possible, the edges of the optical fiber bundles abut the end surface of the light emitting diode only at the central portion, as the end surface of the light emitting diode has convex curved shape. Accordingly, though the luminance at the central portion of the optical fiber bundle is high, the luminance at the peripheral portion is low. Therefore, according to this prior art technique, the displayed characters or figures have uneven luminance.

Further, road signs, advertizing sign boards and so on placed outdoors are exposed to severe conditions such as high wind, snow, heavy rain, high temperature, high humidity or extremely low temperature. However, these signs have not been provided with any countermeasures against the severe conditions. Further, facilities for exchanging parts or antitheft measures have not been considered at all.

In order to improve visibility of the fire hydrant sign, conventionally, a self-light-emitting guide sign having light emitting diodes attached directly or indirectly along the periphery of the fire hydrant sign board, for example, has been used. However, since one light emitting diode is used directly as one lighting point in any of the conventional examples, the same number of light emitting diodes as the number of lighting points are necessary. More specifically, when 16 light emitting diodes are attached around the periphery of a sign board having a diameter of 646 mm and a pitch of about 118 mm, power consumption of the light emitting diodes would be about 0.6 w. When the ratio of time when the light is on and off is set to on:off=1:2, a solar cell having an output of about 3 w would be necessary. If this is implemented by solar cell modules commercially available at present, the size would be about 220×200 mm, which is too large for a guide sign having a diameter of about 650 mm. Further, it is not economical when the cost of the solar cell (1500~2000 yen per 1 W) is taken into account. Thus, if the number of light emitting diodes used is increased, not only the number of solar cells but power consumption of the cell is increased, the cost as a whole is increased, and thus this approach is not practical.

When holding plates such as panels or support members holding the optical fiber are placed opposite to each other and the optical fiber is held on the inner surfaces of the two holding plates, the space between these two holding plates cannot be narrowed to be smaller than a prescribed distance in view of the relation with respect to the curvature of bending the optical fiber, since the optical fiber encounters internal stress and the efficiency in transmitting light through the fiber is decreased when the optical fiber is bent to a certain curvature or more. Therefore, the structure of a conventional self-light-emitting indicating apparatus has been considerably large and unable to be made compact.

Further, structure suffers from the disadvantage that when the self-light-emitting indicating apparatus for attracting attention to the sign of a fire hydrant or the like happens to fall down, tip ends of the optical fibers inserted to the through-holes of the holding plate such as the support member or the panel are damaged.

Further, there is a disadvantage that water is gathered in the enclosure of the self-light-emitting indicating apparatus, causing possible malfunction.

When illumination is to be provided for already existing fire hydrant sign or road sign which does not have illumination light source with it, a self-light-emitting indicating apparatus having an illuminating apparatus must be newly provided.

SUMMARY OF THE INVENTION

An object of the present invention is to provide a self-light-emitting indicating apparatus for explicitly indicating a sign such as fire hydrant sign, which allows use of an existing fire hydrant sign or road sign even if the existing sign is not provided with light source for illumination, and which provides illumination with a simple system.

Another object of the present invention is to reduce leakage loss at a connection between a light emitting diode and an optical fiber, which was experienced in the prior art, so as to reduce power consumption.

Another object of the present invention is to provide an indicating apparatus with smaller power consumption, in view of the disadvantage of the conventional self-light-emitting indicating apparatus that as increased number of light emitting diodes are used, current consumption is increased, solar cells and storage batteries having large capacity become necessary, the overall cost is increased and as a result, it is not economical or practical.

A still further object of the present invention is, when holding plates such as panels or support members holding the optical fiber are placed opposite to each other to hold the optical fiber with their inner surfaces, to make narrower the space between these two holding plates to be less than a prescribed distance while not generating internal stress in the optical fiber and not degrading efficiency in transmitting light, even when the optical fiber is bent to a certain curvature or more, so as to make the structure of the self-light-emitting indicating apparatus compact.

A still further object of the present invention is to protect outdoor sign boards, road signs, fire hydrant signs and so on which are exposed to severe conditions such as high wind, snow, heavy rain, high temperature, high moisture or extremely low temperature.

A still further object of the present invention is to facilitate exchange of a battery and to prevent theft of parts such as a storage battery, in view of the fact that a nickel-cadmium storage battery or the like has its charging performance rapidly degraded after repetitive charging/discharging of 400 to 500 times, and therefore exchange of the storage battery is necessary once in every one and a half or every two years.

A still further object of the present invention is to provide a technique which allows an increase in curvature of the optical fiber without decreasing efficiency in light transmission.

A further object of the present invention is to provide a technique which can solve a problem in that tip ends of the optical fibers inserted into through holes of the holding plate such as the support member or the panel are damaged when the self-light-emitting indicating apparatus for attracting attention to the sign of a fire hydrant or the like happens to fall down.

A still further object of the present invention is to provide a technique for solving the problem of water gathering in the enclosure of the self-light-emitting indicating apparatus, causing malfunction.

According to one aspect of the present invention, the optical leakage preventing apparatus used for connection between a light emitting diode and an optical fiber of the present invention includes a holder formed of a synthetic resin having a through hole, on an inner peripheral surface of which a light reflecting member is provided by electroless plating or by means of a reflective sheet; a plurality of optical fiber bundles adhered and fixed by means of an adhesive in the through-hole of the holder; and a light emitting diode inserted and fixed in the through-hole at a position opposite to the optical fiber bundles with a prescribed small space for diffusion of light, inserted and fixed in the through-hole.

According to the another aspect of the present invention, the optical leakage preventing apparatus of the present invention includes a fiber holder of a synthetic resin having a plurality of through-holes; a plurality of optical fiber fundles inserted and fixed in the through-holes of the holder; a diode holder of a synthetic resin having a plurality of through-holes, the inner peripheral surface of which through-hole is provided with a light reflecting member in the form of electroless plating, reflective sheet, or a metal thin film of alminium; a light emitting diode inserted and fixed in the through-hole of the light emitting diode holder; and fixing means for clamping the fiber holder and the light emitting diode holder.

In a preferred embodiment of the optical leakage preventing apparatus of the present invention, the optical leakage preventing apparatus described above further includes a light intercepting/light reflecting packing interposed between the optical fiber holder and the light emitting diode holder.

Since the optical leakage preventing apparatus used for connection between the light emitting diode and the optical fiber of the present invention described above is provided with light reflecting member such as electroless plating, reflective sheet, or a metal thin film of alminium, on the inner peripheral surface of the through hole of the holder formed of synthetic resin or has light reflecting member of electroless plating adhered on the side surface of the light emitting diode, light emitted from the light emitting diode is entirely reflected in the through-hole, or reflected to the direction of the optical fiber by the electroless plating on the side surface of the light emitting diode, and is transmitted through the optical fiber. Therefore, the light does not leak to the outside at the connection between the light emitting diode and the optical fiber but is transmitted entirely in the optical fiber.

According to one aspect of the present invention, the self-light-emitting indicating apparatus of the present invention includes (a) an enclosure formed by combining a pair of semi-tubular bodies opposing to each other having first and second waterproof support members, arranged opposite to each other at both ends on the inner side; (b) a first panel fixed on the first support member of the enclosure and having a plurality of through-holes and having a sign indicating portion; (c) a second panel fixed on the second support member of the enclosure; (d) a container portion defined by the enclosure and the first and second panels; (e) a plurality of optical fibers contained in the container portion, each having one end inserted and fixed in each of a plurality of through-holes provided at least in the first or the second panel; (f) a light emitting diode contained in the container portion, arranged adjacent to the other ends of the plurality of optical fibers which are bundled and cut, and including an optical leakage preventing means; (g) power supply for the light emitting diode; and (h) a metal fitting attached to the enclosure or to the second panel and fixed on the enclosure or the second panel.

According to still another aspect of the present invention, the self-light-emitting apparatus of the present invention includes (a) an enclosure provided with mutually opposing first and second support members arranged at both ends of a tubular body and having a plurality of through-holes; (b) a container portion defined by the enclosure and the first and second support members; (c) a plurality of optical fibers contained in the container portion each having one end inserted and fixed in each of a plurality of through holes of at least one of the first and second support members; (d) a light emitting diode contained in the container portion, arranged adjacent to the other end of the optical fibers and having an optical leakage preventing means; (e) a power source for the light emitting diode; (f) a lid covering the container portion; and (g) a metal fitting attached to the lid or the enclosure for fixing the lid or the enclosure.

Self-light-emitting indicating apparatus of the present invention, by the combination of a small number of light emitting diodes and optical fibers arranged adjacent thereto, light points of light having nearly monochromatic wavelength can be provided in wider space with large intervals along the periphery of the sign board. Therefore, the position of the fire hydrant sign, for example, can be clearly indicated especially when the light points flickered, and the effect of guiding can be much improved.

In a preferred embodiment of the self-light-emitting indicating apparatus of the present invention, the optical leakage preventing means of the light emitting diode is implemented by the above-described optical leakage preventing apparatus, or by an electroless plating effected on a coated side surface of the light emitting diode.

In another preferred embodiment of the self-light-emitting indicating apparatus of the present invention, the power supply is a solar cell attached on a solar cell holder provided on the enclosure or on the second panel.

In a still another preferred embodiment of the self-light-emitting indicating apparatus of the present invention, the power supply is a solar cell attached on a solar cell holder provided on the lid or the support member.

According to a still further aspect, the self-light-emitting indicating apparatus of the present invention includes (a) first and second holding plates having a plurality of through-holes and arranged opposing to each other with a prescribed distance; (b) first optical fibers arranged approximately parallel to and near an inner surface of the first holding plate, bent with a prescribed curvature and having one end inserted through respective through-holes of the second holding plate; (c) second optical fibers arranged approximately parallel to and near an inner surface of the second holding plate and crossing the first optical fibers, bent with a prescribed curvature and each having one end inserted to respective through holes of the first holding plate; (d) a light emitting diode arranged adjacent to the other end of each of the first and second optical fibers; and (e) a power supply for the light emitting diode.

In the self-light-emitting indicating apparatus in accordance with still another embodiment of the present invention, when holding plates such as panels or support members holding the optical fibers are placed opposite to each other and the optical fiber is held by both holding plates at the inner surfaces of the holding plates, optical fibers are bent at a certain curvature and optical fibers held by the holding plates are crossed, in a range not damaging mechanical characteristics and not degrading optical characteristics of the optical fibers (acryl) such as the light transmittance or the refractive index, so as to make narrower the space between the holding plates. Further, in order to increase curvature of bending the optical fiber, heat treatment is effected to prevent degradation of the light transmittance and the refractive index and to prevent damage to the mechanical characteristics, of the optical fiber.

In accordance with still another aspect of the present invention, the self-light-emitting indicating apparatus of the present invention includes (a) a holding plate having a plurality of through-holes; (b) optical fibers each having one end inserted through-hole of the holding plate; (c) an adhesive applied around the through-hole to which the optical fiber is inserted at the inner surface of the holding plate and applied at the periphery of the optical fiber, so as to adhere and fix the optical fiber on the holding plate; a light emitting diode arranged adjacent to the other end of the optical fiber; and (e) a power supply for the light emitting diode; in which the optical fiber is bent with a prescribed curvature by external pressure at a prescribed position from one end of the optical fiber fixed on the holding plate, and the portion bent by the external pressure of the optical fiber is heated for a prescribed time period so as to reduce stress caused by bending strain at the bent portion by the external pressure.

According to still another aspect of the present invention, the self-light-emitting indicating apparatus of an embodiment of the present invention includes (a) a holding plate having a plurality of through-holes; (b) optical fibers each having one end inserted through the through-hole of the holding plate and bent with a prescribed curvature at a prescribed position from one end by heating and keeping at the heated temperature for a prescribed time period; (c) a light emitting diode arranged adjacent to the other end of the optical fiber; and (d) a power supply for the light emitting diode.

In a preferred embodiment of the self-light-emitting indicating apparatus of the present invention, the optical fiber is bent with the curvature of $70 \leq r < 100d$ by means of heat treatment, where d represents the diameter of the optical fiber and r represents the radius of curvature of the optical fiber.

According to a still further aspect, the self-light-emitting indicating apparatus of the present invention includes (a) a holding plate having an auxiliary plate arranged spaced by a prescribed distance from or arranged directly in contact with the holding plate, and a plurality of through-holes which are also provided in the auxiliary plate; (b) optical fibers each having one end inserted to the through-hole of the holding plate; (c) a light emitting diode arranged adjacent to the other end of the optical fiber; and (d) a power supply for the light emitting diode; in which the relation $D \geq 4d$ holds, where d represents distance from outer surface of the holding plate to outer surface of the auxiliary plate, and d represents the diameter of the optical fiber.

In still another embodiment of the present invention, in the self-light-emitting indicating apparatus, the auxiliary plate has approximately the same coefficient of thermal expansion as that of the holding plate.

In the self-light-emitting indicating apparatus in accordance with a still another embodiment of the present invention, at least one of an extended portion of the tubular body and the lid is set to be little protruded from one edge of the optical fiber protruding from the through-hole of the support member. By virtue of this structure, the tip end of the optical fiber will not be damaged even when the self-light-emitting apparatus happens to fall down.

In the self-light-emitting indicating apparatus in accordance with a still further embodiment of the present invention, a draining hole is provided at a lower portion of the enclosure of the self-light-emitting indicating apparatus, and therefore water, in the form of rain drops, does not gather.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a partial cross section of the self-light-emitting indicating apparatus in accordance with another embodiment of the present invention.

DESCRIPTION OF THE PREFERRED EMBODIMENTS

Embodiments of the present invention will be described with reference to the figures.

Figure 1:
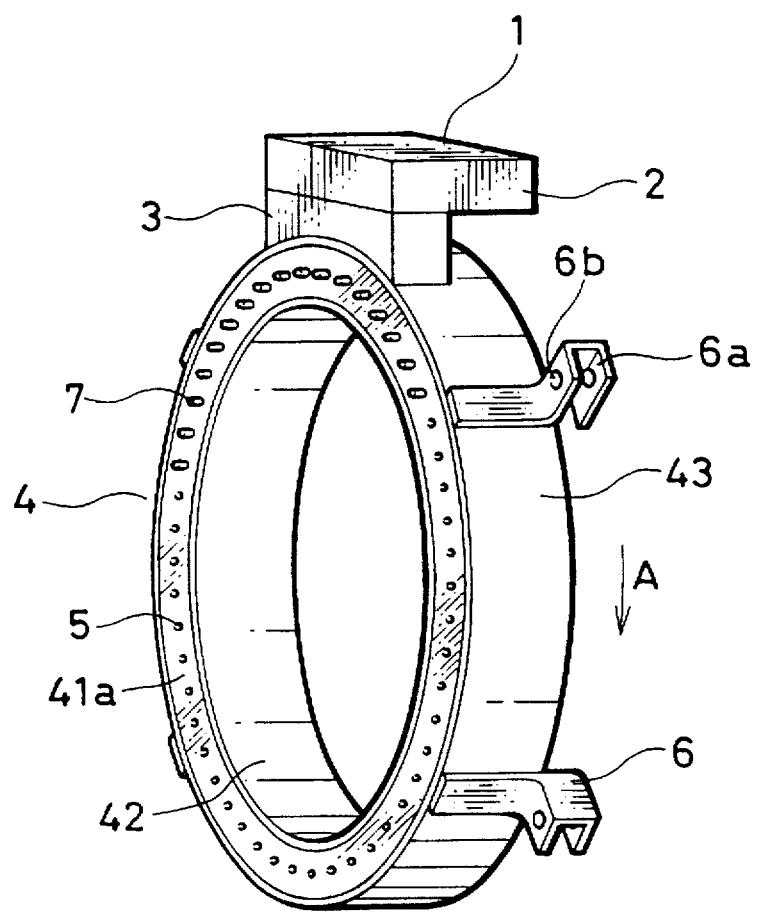
FIG. 1 is a perspective view showing a self-light-emit indicating apparatus for a guide sign in accordance with a first embodiment of the present invention.

The first embodiment of the present invention will be described with reference to FIGS. 1 and 2. A solar cell holder 2 on which a solar cell module 1 is fixed is attached above first and second support members 41a and 41b having outer diameter of 674 mm by means of a support body 3. Through holes 5 through which optical fibers formed of acryl protrude are provided at the first and second support members 41a and 41b. In the through-holes 5, a total of 102 optical fibers 7 having a diameter of 0.75 mm are arranged, protruding by 2 mm from the outer wall of the support members 41a and 41b and fixed by an epoxy resin at the support members 41a and 41b with an interval of about 40 mm. In the solar cell holder 2, a storage battery and a circuit for driving the apparatus for flickering are contained. In a recessed container portion 9 defined by an inner tubular body 42 formed of an ABS resin and by the first and second support members 41a and 41b, two light emitting diodes (having the diameter of 10 mm) 8a, 8b, 102 optical fibers 7, wires and so on are contained. At a peripheral portion of support members 41a and 41b, arm attachment fittings 6 are fixed, by which arm attachment fittings 6, the apparatus can be attached on attachment arms 11a, 11b and 11c of an existing fire hydrant sign board 10.

Figure 2:
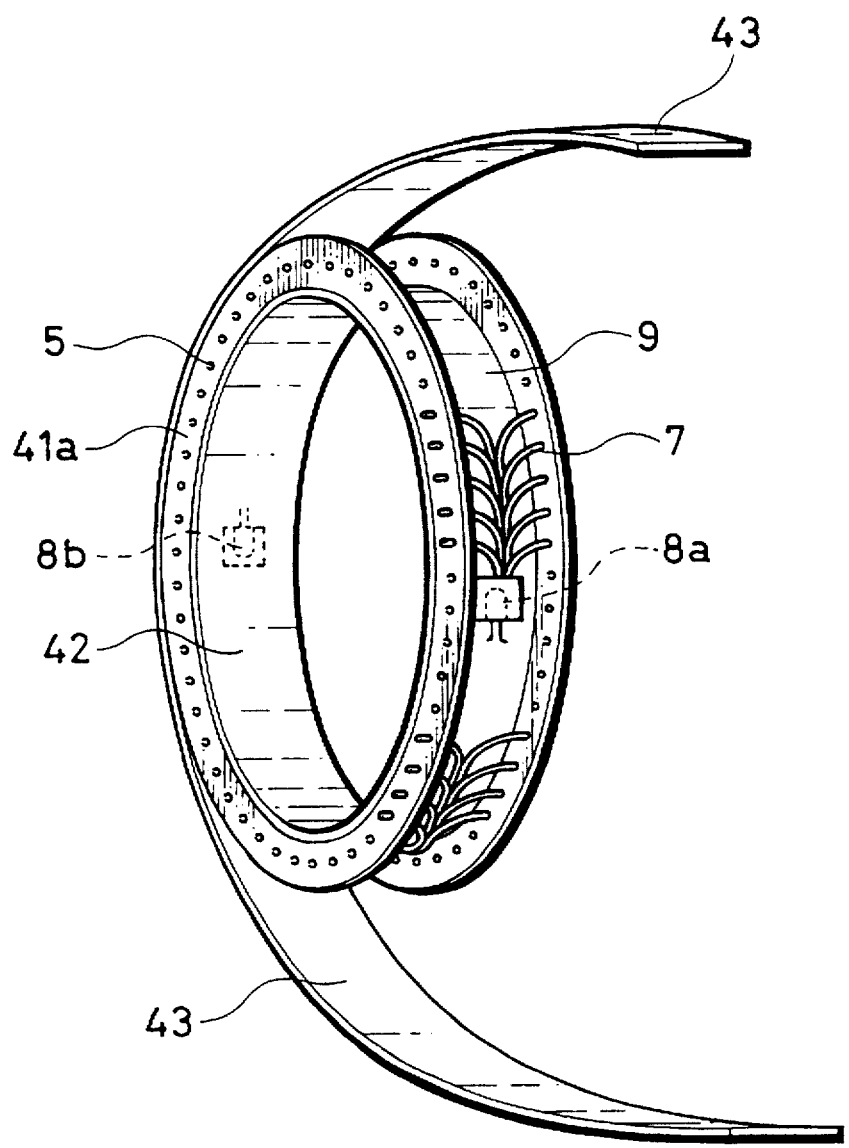
FIG. 2 is a perspective view showing internal structure of the self-light-emitting indicating apparatus shown in FIG. 1.

FIG. 2 is a perspective view illustrating the inside of the apparatus showing the support members 41a and 41b covered by a band shaped lid 43.

Here, trailing edge of optical fiber 7 may be protruded to the side of the outer wall from the side of the inner wall of the internal tubular body 42 for flickering. Further, the arrangement of the tubular body 42 and the lid 43 may be reversed so that the tubular body 42 faces outward and the lid 43 faces inward.

Figure 3:
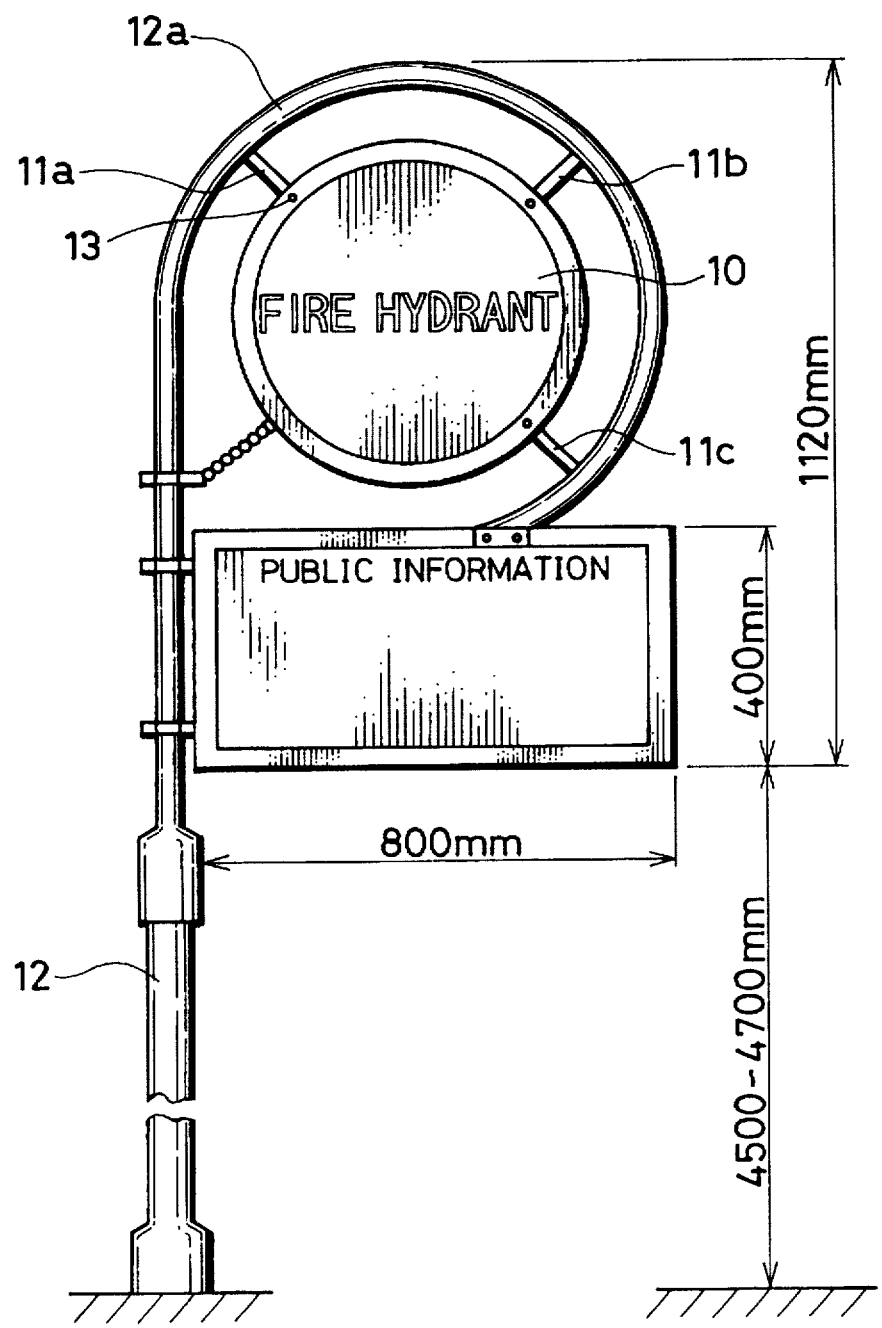
FIG. 3 shows an existing fire hydrant sign to which the self-light-emitting indicating apparatus of FIG. 1 is attached.
Figure 4:
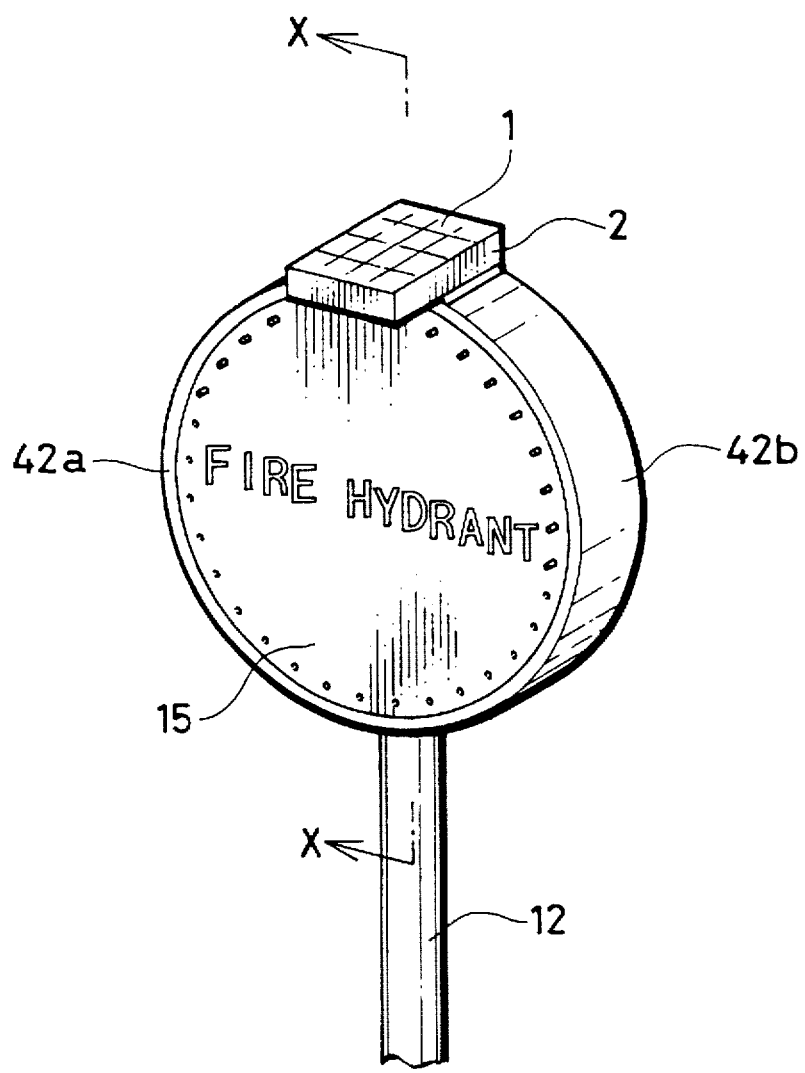
FIG. 4 is a perspective view of the self-light-emitting indicating apparatus in accordance with a second embodiment of the present invention.

FIG. 3 is a perspective view of a commonly used existing fire hydrant sign board which includes a pole 12, a ring shaped portion of the pole 12a, attachment arms 11a, 11b and 11c fixed by welding on the ring shaped portion 12a, and a sign board 10 of iron having a thickness of about 1 mm, fixed on the attachment arms 11a, 11b and 11c by means of bolts and nuts 13.

The ring shaped light emitting body for indication is attached to the sign board 10 in the following manner. Namely, referring to FIG. 1, by attachment fittings 6 of the ring shaped light emitting body, the ring shaped light emitting body is pressed against the attachment arms 11a, 11b and 11c of the existing fire hydrant sign board 10, and the body is rotated in one direction (in the direction of the arrow A), and by this simple operation, the attachment fittings 6 can be attached and fixed on the attachment arms 11a, 11b and 11c. More specifically, in the recessed portion 6a of the attachment fittings 6, attachment arms 11a, 11b and 11c are fitted, bolts are inserted to attachment holes 6b, and the attachment fittings 6 are fixed on attachment arms 11a, 11b and 11c by fastening, by means of nuts. Accordingly, installment of the light emitting body on the sign body 10 is very easy. Since attachment/detachment is so easy, the apparatus can be attached not only to general signs in town but also to signs at construction sites or the like where commercial power supply is not available, temporarily or permanently.

According to the present embodiment, visibility of the sign board 10 can be improved by using a very small number of light emitting diodes and by arranging a number of lighting points in an enlarged area at arbitrary three dimensional positions by means of optical fibers. In order to verify visibility at night, the inventor performed an experiment in which the diameter of the optical fiber, the interval for arrangement of the optical fibers, and current consumption of the light emitting diodes were changed variously, and luminance from the distance of 100 m was compared at night. As a result, it was proved that by using two light emitting diodes having the diameter 10 mm and 5000 mcd and flickering the lighting points arranged in the manner as described above, the luminance was sufficient and the indication was visible enough. According to the conditions for arrangement specified above, the power consumption of the light emitting diode can be reduced to about 0.07 w, which can be afforded by a solar cell having the output of about 0.4 W, so that the economical effect is remarkable.

Since the power consumption can thus be reduced, a guide sign which operates sufficiently only by providing a solar cell having the size of about 220×50 mm, can be implemented. Since the solar cell module, the storage battery, flickering circuit and a ring shaped light emitting body can be coupled integrally, the guiding sign can be made compact and portable, and hence it can be freely attached, by means of the body attachment fittings 6, directly on the existing fire hydrant sign board 10.

Since attenuation of light intensity can be neglected because of the combination of the light emitting diode and the optical fiber, and light having nearly monochromatic wavelength flickers, it has superior guiding effect, and therefore a guiding sign having simple structure and superior performance can be obtained by virtue of the characteristics of the light emitting diodes and optical fibers as well as that of the solar cell.

Further, the guide sign described above is suitable for various and wide applications such as various road signs, number indicating boards, advertizing sign boards, various guide signs and so on and therefore it contributes much to fire fighting operation, traffic control, advertizement, and so on.

A second embodiment of the present invention will be described with reference to FIGS. 4 to 8. In these figures, the same or corresponding portions as in the first embodiment shown in FIGS. 1 to 3 are denoted by the same reference characters.

On both ends of semi-tubular bodies 42a and 42b formed of a synthetic resin such as acryl or of aluminum, first and second support members 41a and 41b as well as an engaging recessed portion are formed integrally, and on the tubular body, solar cell holder 2 is arranged. A disc shaped first panel 15a formed of aluminum or a synthetic resin such as acryl for indicating a fire hydrant sign, characters and symbols are provided, and along the characters and symbols, throughholes 5 are provided, to which optical fibers 7 of acryl are inserted and fixed. On a disc shaped second panel 15b formed of aluminum or a synthetic resin such as acryl, a nickel cadmium battery 16 or the like for charging is attached. However, it may be also provided with throughholes 5 to which optical fibers 7 of acryl are inserted and fixed for indicating characters or signs as needed. At engaging recessed portions 141a and 141b provided at both ends of one semi-tubular body 42a, halves of the first and second panels 15a and 15b are engaged and fixed. Thereafter, at engaging recessed portions 141a and 141b provided at both ends of the other semi-tubular body 42b, remaining halves of the first and second panels 15a and 15b are engaged and fixed, respectively. On the inner side of the first panel 15a, an optical leakage preventing apparatus 17 for connecting the light emitting diode 8, which will be described later, is attached. In a container portion 14 defined by the semi-tubular bodies 42a and 42b, the first panel 15a and second panel 15b, a flickering circuit, a detecting circuit for detecting whether or not the outside is dark, a switch circuit for turning on/off the power supply to the light emitting diode in accordance with the detected output, and so on are contained. A part detachment hole 19 is provided at the second panel 15b at a position where the storage battery can be detached for exchange, and the part attachment hole 19 is covered by a lid 20 for part exchange. Attachment fittings 21 for attaching the body on the pole 12 are fixed by vises 22a and nuts 22b on the second panel 15b, and the position is set such that the pole 12 is just placed on the lid 20 for part exchange. Base 23 of the attachment fitting 21 is fixed by welding on the second panel 15b of aluminum.

Since one end of the optical fiber is provided along characters or symbols on the first panel 15a and protruded by about 2 mm from the surface of the panel, view angle from the outside is wide. If the view angle is to be further widened, the end of the optical fiber may be adapted to have the diversions of about 60° from the tip end thereof, in such a shape as a pencil head.

The container portion 14 defined by the engaging recessed portions 141a and 141b of the semi-tubular bodies 42a and 42b and by the first and second panels 15a and 15b is perfectly sealed, and there is not a possibility of water entering the container portion. Meanwhile, it is necessary to let external air in or it is necessary to prevent mist drops from being gathered, a small through-hole 24 may be provided at a lower portion of the semi-tubular bodies 42a and 42b.

Figure 21:
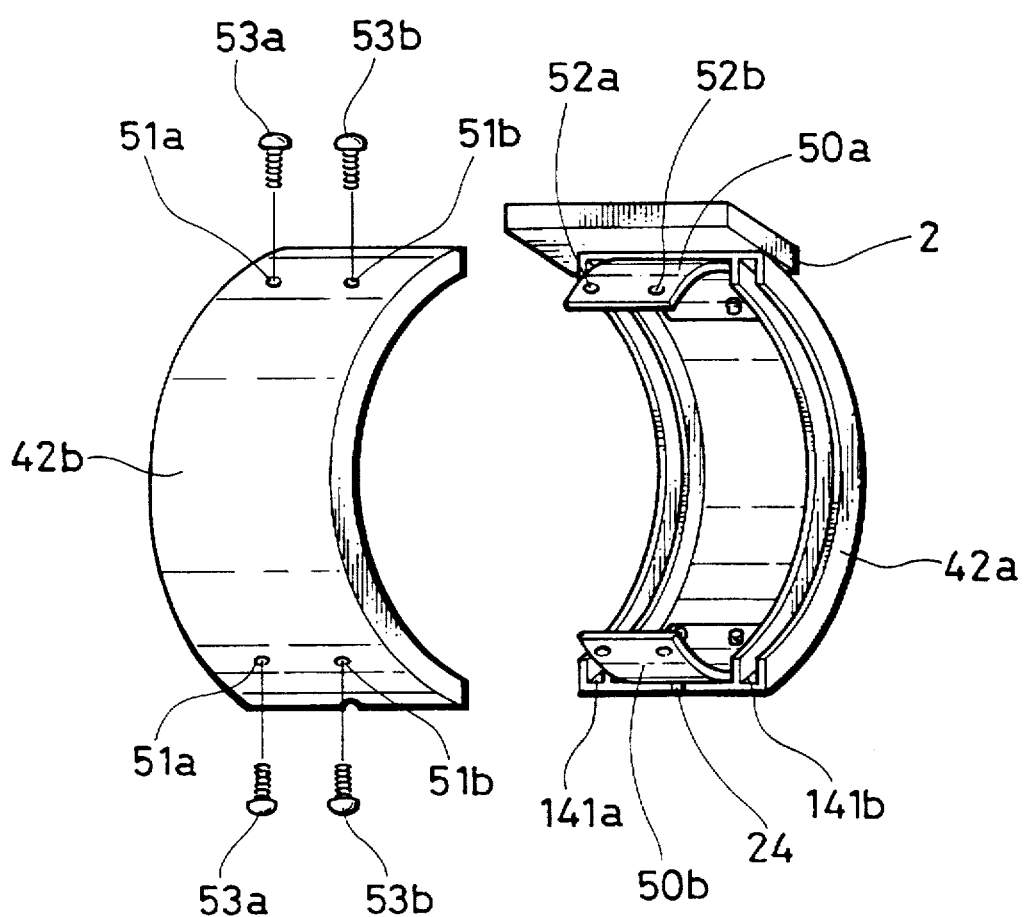
FIG. 21 is an exploded prospective view of the self-light-emitting indicating apparatus in accordance with the second embodiment of the present invention shown in FIG. 4.

As shown in FIG. 21, connecting plates 50a and 50b formed of aluminum and having approximately the same curvature as the inner surface of semi-tubular bodies 42a and 42b, which plates are provided in advance, are putted on the inside of the semi-circular bodies 42a and 42b, and the connecting plates are fixed by inserting eyelets 53a and 53b in fitting holes 51a and 51b of semi-tubular bodies 42a and 42b and fitting holes 52a and 52b of connecting plates 50a and 50b for connecting the semi-tubular bodies 42a and 42b with each other. Further, solar cell holder 2 is also fixed by stacking solar cell holder 2, semi-tubular bodies 42a and 42b and connecting plates 50a and 50b with each other and then inserting eyelets (not shown into fitting holes (not shown) bored through them, before solar cell module 1 is attached to solar cell holder 2.

Figure 8:
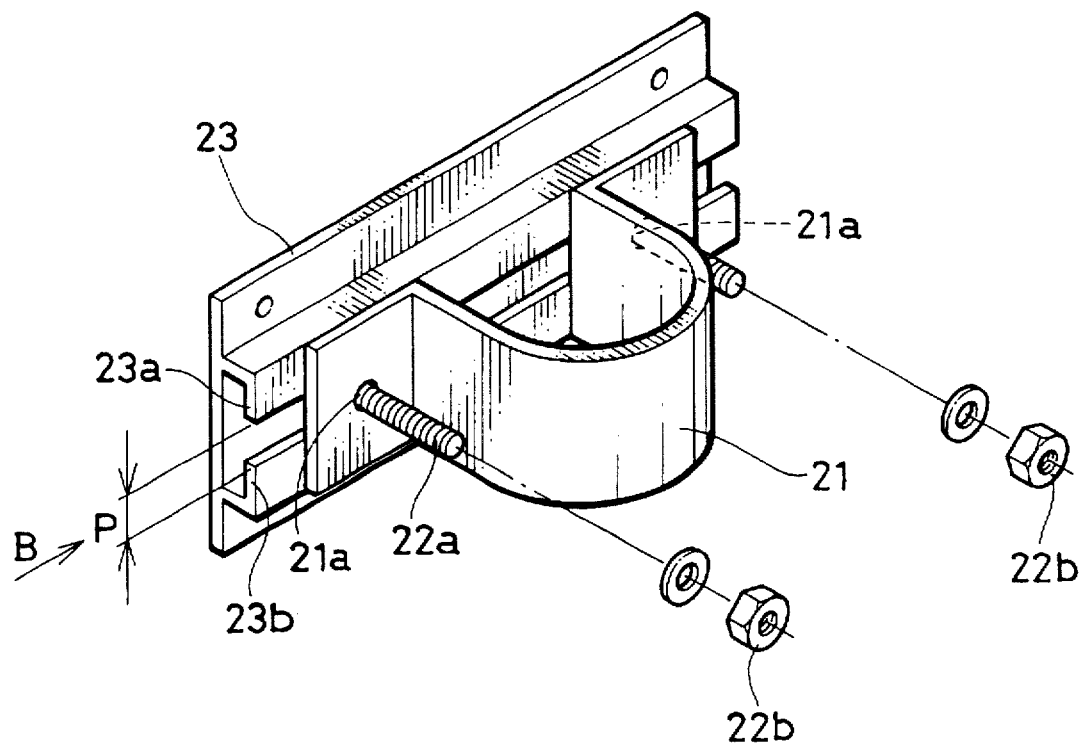
FIG. 8 is an exploded perspective view of the metal fitting of the self-light-emitting indicating apparatus of the present invention.

As shown in FIG. 8, the space P between L-shaped fittings 23a and 23b on the base 23 is narrower than the head of vis 22a but little wider than the diameter of the threaded portion thereof. Therefore, fitting 21 is inserted to space P from the direction of the arrow B with the vis 22a inserted to the threaded hole 21a, and it is fastened on the L-shaped fitting by means of nut 22b.

Figure 6:
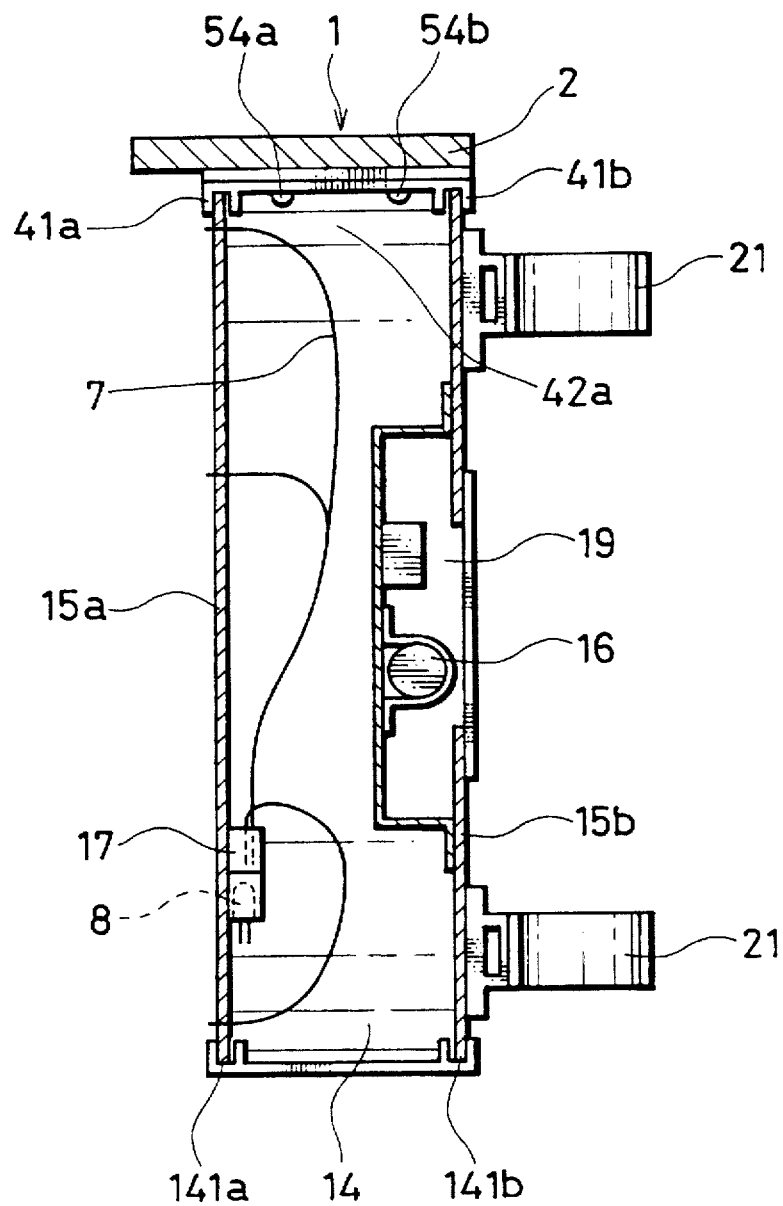
FIG. 6 is a cross section taken along the line X—X of the self-light-emitting indicating apparatus shown in FIG. 4.
Figure 7:
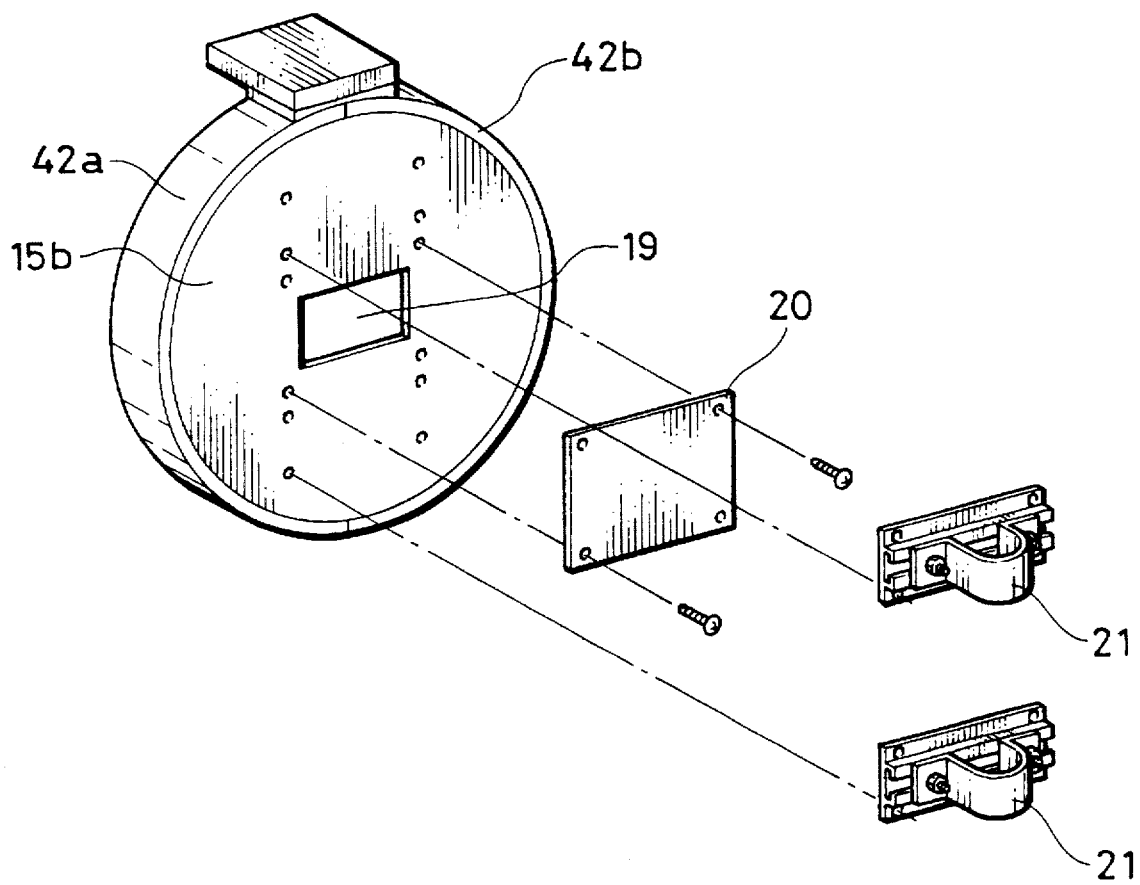
FIG. 7 is an exploded perspective view at the time of assembly of the self-light-emitting indicating apparatus shown in FIG. 4.

With regard to the self-light-emitting indicating apparatus shown in FIGS. 6 and 7 as well, solar cell holder 2 and semi-tubular bodies 42a and 42b with each other and then inserting eyelets 54a and 54b into fitting holes (not shown) bored through them, before solar cell module 1 is attached to solar cell holder 2.

By flickering the indicating apparatus at night, (a) visibility is improved, and (b) electric energy can be reduced. According to the experiment by the inventor, when the indicating apparatus is kept on for about 0.4 to 0.6 seconds and kept off for 0.8 to 1.2 seconds, the effects (a) and (b) can both be obtained and the apparatus is very practical.

Figure 18:
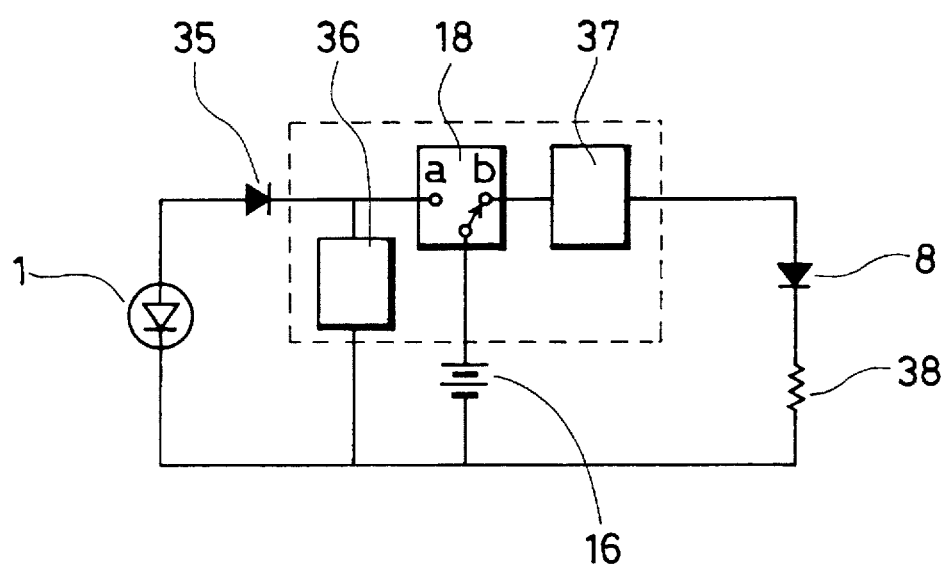
FIG. 18 shows a power source circuit of the self-light-emitting indicating apparatus in accordance with one embodiment of the present invention.

FIG. 18 shows one example of a power source circuit used in the present invention. The electromotive voltage E of a solar cell 1 is 4.8V, and two solar cells are connected in series in this example. A diode 35 is provided for preventing reverse flow, and it prevents flow of current from storage battery 16 to the solar cell 1 when irradiation of solar cell is stopped and electromotive voltage E is not generated. A detecting circuit 36 detects whether or not the outside is dark. In response to the detection output, a switching piece of switch circuit 18 is switched to the side a or to the side b, which switch turns ON/OFF the power supply to the light emitting diode 8. Specifically, when the electromotive voltage of solar cell 1 is about 9V in day time, the switch is switched to the side a, and if the electromotive voltage is near 0V in the dark at night, the switch is switched to the side b. The reference numeral 37 denotes a circuit for flickering. A protective resistance 38 is provided for preventing flow of excessive current to the storage battery 16 when light emitting diode (LED) 8 is short-circuited, and it is set to allow flow of an appropriate current (in this embodiment, 18 to 20 mA) to the LED (in this embodiment, 100Ω).

Since a nickel cadmium storage battery degrades when charging/discharging is repeated, it must be exchanged at least once every other year. For this purpose, the part detachment hole 19 is necessary. It is possible that the storage battery in the hole is stolen by opening the lid 20 for part exchange. However, since the pole is positioned just on the lid for part exchange in the present invention, the lid for part exchange cannot be readily opened, which is an effective theft deterrent.

A third embodiment of the present invention will be described with reference to FIGS. 9 to 12.

Figure 9:
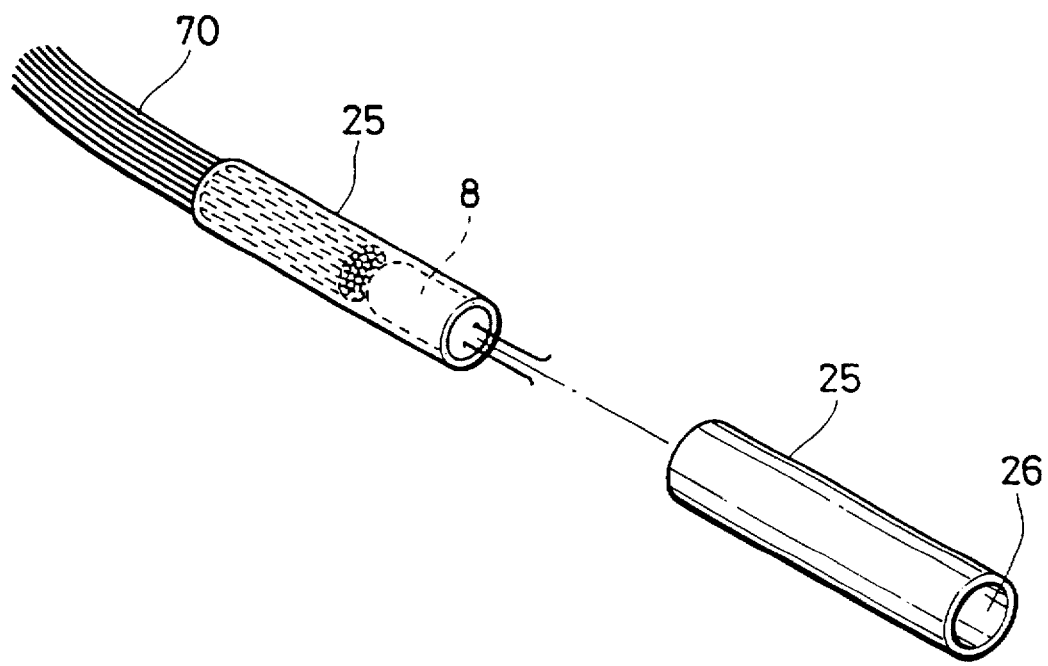
FIG. 9 is a partially exploded perspective view of an optical leakage preventing apparatus for connection for a light emitting diode in accordance with a third embodiment of the present invention.

Referring to FIG. 9, a sleeve-shaped holder 25 formed of a synthetic resin has a light reflecting member 26 in the form of electroless plating, light reflecting sheet or a metal thin plate such as aluminum on an inner peripheral surface of the through hole thereof, in which through-hole, a plurality of optical fiber bundles 70 are adhered and fixed by means of an adhesive. At a position opposite to the edges of the optical fiber bundles 70 inserted and fixed in the through-hole, a light emitting diode is fixed by means of an adhesive, with a prescribed small space (0.5-2 mm) for light diffusion.

The reflective sheet used here is a recurrent reflecting member obtained by embedding transparent fine particles of glass in a transparent resin layer and providing a deposition layer of metal on the rear side of the fine particles with a prescribed distance.

Figure 11:
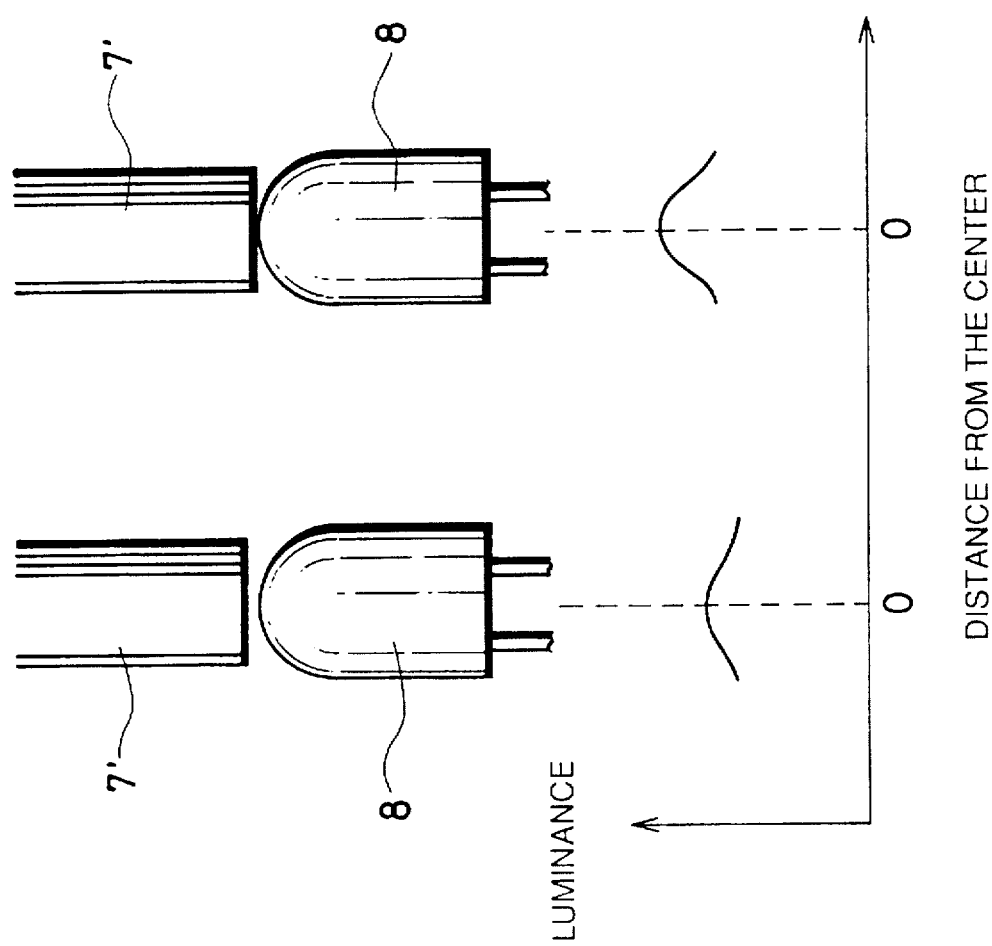
FIG. 11 is a graph showing how the light is diffused in accordance with the present invention.

The effect of light diffusion when a small space (0.5-2 mm) is provided between the edges of the optical fiber bundles 7' and the light emitting diode is as shown in FIG. 11. More specifically, the luminance at the center and at the peripheral portion of the optical fiber change as shown in the right part of FIG. 11 when the edges of the optical fiber bundles 7' is directly in contact with the light emitting diode 8. Meanwhile, when a small space (0.5-2 mm) is provided between the edges of the optical fiber bundles 7' and the light emitting diode, the luminance changes as shown in the left part of FIG. 11, that is, the difference in luminance at the center and the peripheral portion can be reduced.

Figure 10:
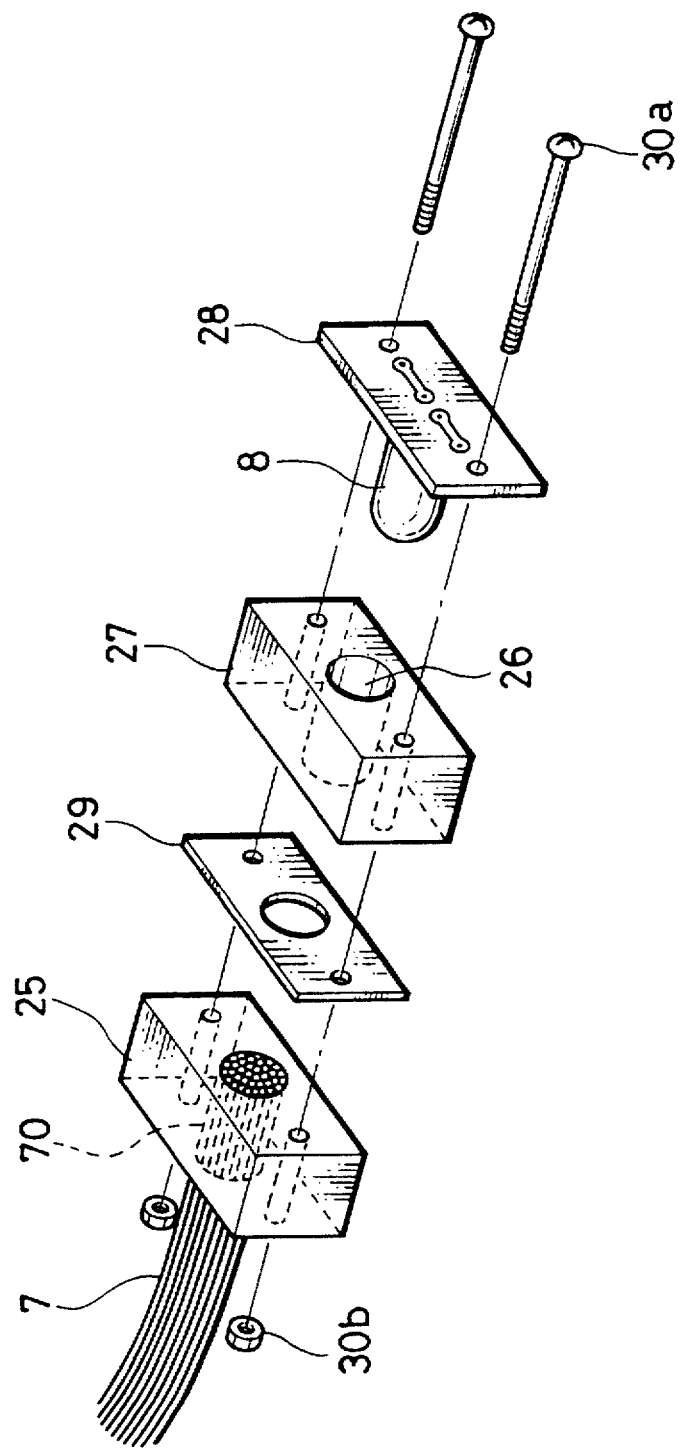
FIG. 10 is a partially exploded perspective view of one modification of the optical leakage preventing apparatus in accordance with the third embodiment of the present invention.

FIG. 10 shows one modification of the optical leakage preventing apparatus in accordance with the third embodiment of the present invention. Referring to FIG. 10, a rectangular holder 25 of synthetic resin is provided with a light reflecting member 26 in the form of electroless plating, light reflecting sheet or a metal thin plate such as aluminum on the inner peripheral surface of a through thereof, and in the through-hole, a plurality of optical fiber bundles are adhered and fixed by means of an adhesive. At this time, an epoxy resin is applied over about 5 cm from the tip end of the optical fiber bundle, the optical fiber bundle is inserted to the holder 25 of the synthetic resin and protruded by about 3 cm from the surface of the holder, and the epoxy resin is hardened in this state. After the resin is hardened, the protruded optical fibers are cut by a saw, edges of the optical fiber bundles is polished by means of a file and a sandpaper, and then the edges are subjected to buffing (using a grinder formed of cloths), so that the edges of the optical fibers are mirror-finished. On the inner peripheral surface of the through-hole of the light emitting diode holder 27, light reflecting material 26 such as electroless plating or light reflecting sheet is provided, and light emitting diode 8 has its electrode soldered onto a copper foil of a printed board 28. Light emitting diode 8 is inserted to the through-hole of light emitting diode holder 27, it abuts the fiber holder 25 with a light intercepting/light reflecting packing 29 formed of a synthetic resin interposed, and together with the light emitting diode holder, it is fastened and fixed by means of bolts 30a and nuts 30b. Since there is provided the light intercepting/light reflecting packing 29, the light does not leak in directions other than the optical fiber, even when the edge surfaces of light emitting diode holder 27 are not in tight contact with the optical fiber holder 25.

Figure 12:
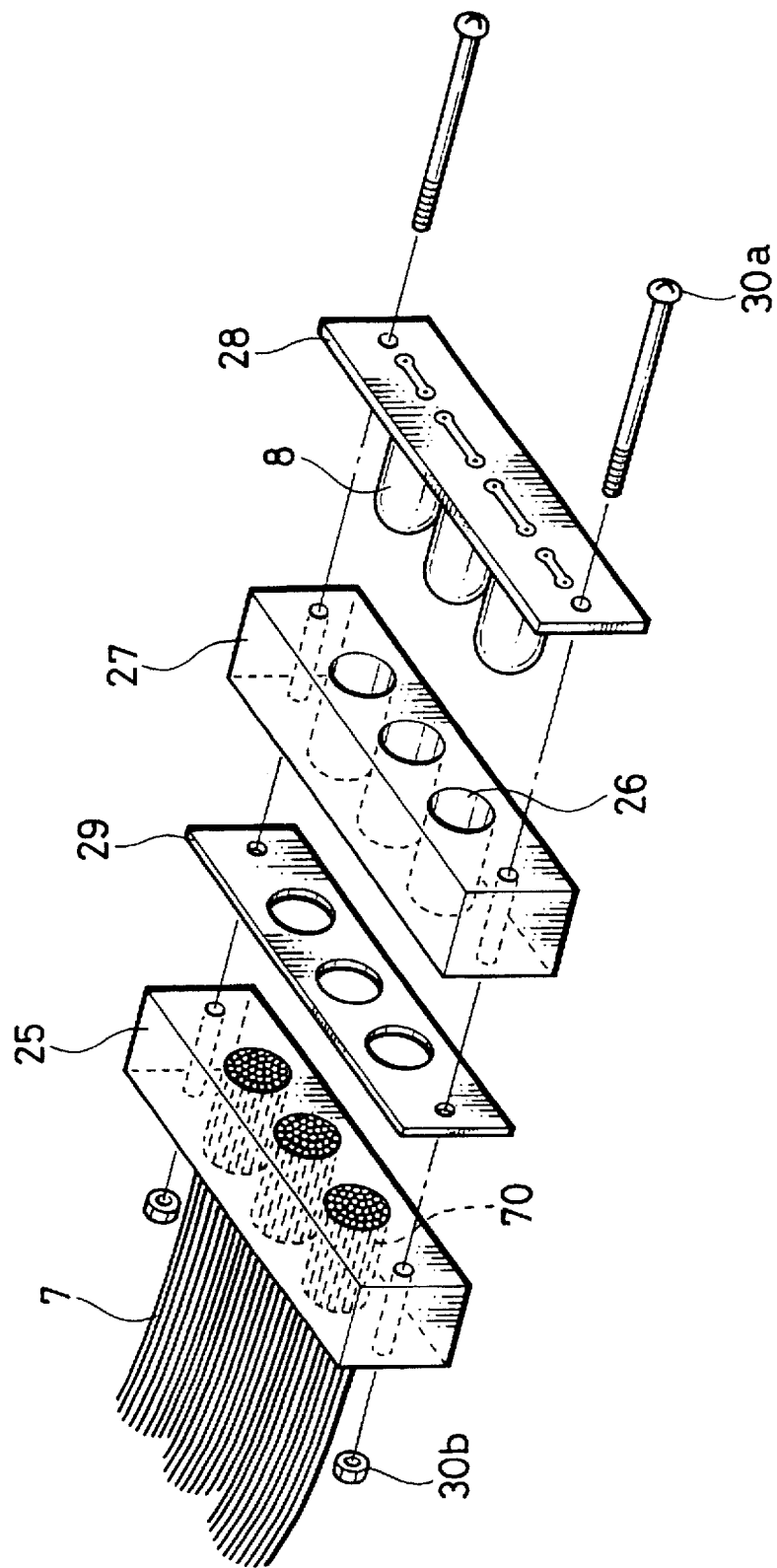
FIG. 12 shows another modification of the optical leakage preventing apparatus in accordance with the third embodiment of the present invention.

FIG. 12 shows one modification of the present embodiment. Referring to FIG. 12, this embodiment differs from that of FIG. 10 only in that three through-holes are provided in a rectangular holder 25 formed of a synthetic resin. More specifically, on the inner peripheral surface of the through-holes, light reflecting member 26 of electroless plating, light reflecting sheet or metal thin plate such as aluminum is provided, and a plurality of optical fiber bundles are adhered and fixed in these through-holes, respectively by an adhesive.

Figure 13A:
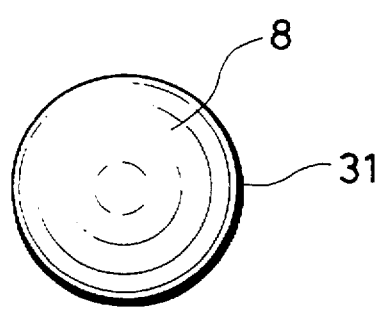
FIGS. 13A, 13B and 13C are a plan view, a front view and a perspective view, respectively, of the optical leakage preventing apparatus in accordance with a fourth embodiment of the present invention.
Figure 13B:
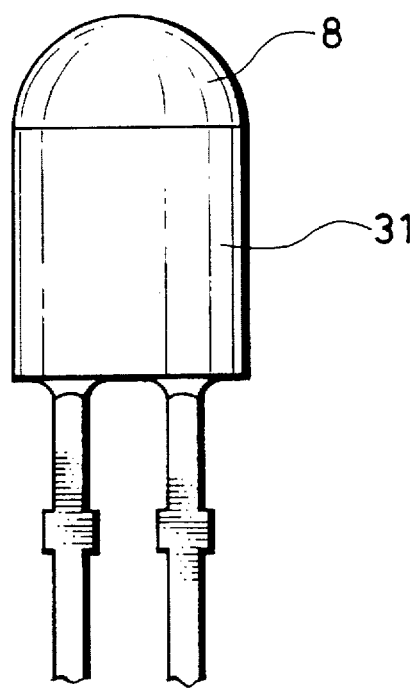
Figure 13C:
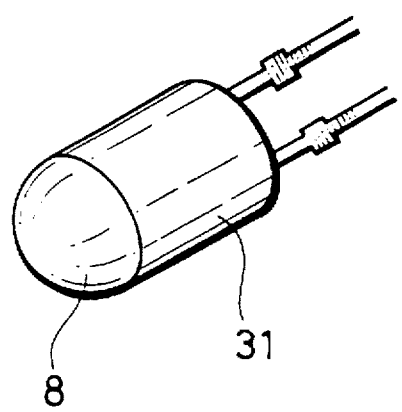

A fourth embodiment of the present invention will be described with reference to FIGS. 13A, 13B and 13C. Referring to FIGS. 13A to 13C, a side surface of the light emitting diode is provided with electroless plating 31. In this case, optical reflecting member need not be provided in the through-holes of the optical fiber holder 25 and the light emitting diode holder 27.

Figure 14A:
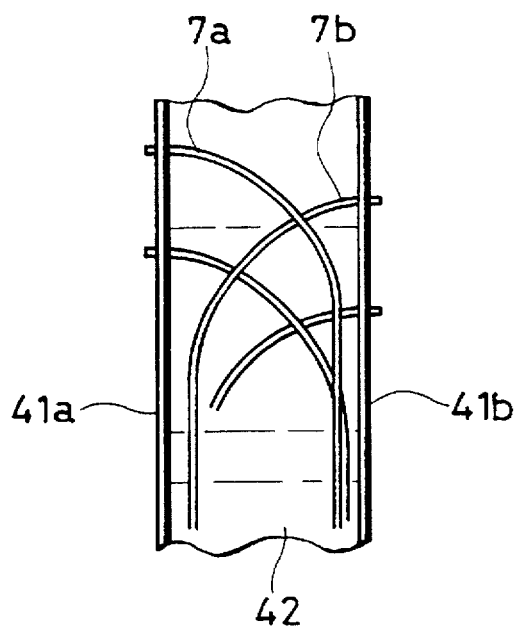
FIGS. 14A and 14B are a front view and a perspective view, respectively, of an optical leakage preventing apparatus in accordance with a fifth embodiment of the present invention.
Figure 14B:
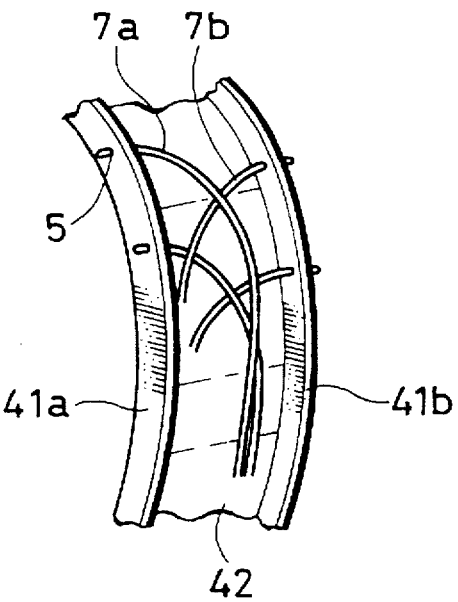

A fifth embodiment of the present invention will be described with reference to FIGS. 14A and 14B. Referring to FIGS. 14A and 14B, in this embodiment, when optical fibers 7 are to be provided in the through-holes 5 of the first and second support members 41a and 41b of the tubular body 42 shown in FIG. 2, optical fibers 7a and 7b are provided crossing each other, so as to reduce the distance between the first and second support members 41a and 41b. More specifically, optical fiber 7a inserted through the through-hole 5 of the first support member 41a is arranged approximately parallel along the inner surface of the second support member 41b, while optical fiber 7b inserted into through-hole 5 of the second support member 41b is arranged approximately parallel along the inner surface of the first support member 41a, while both optical fibers are arranged crossing each other, and each bent at a prescribed curvature. Accordingly, the space between the first and second support members 41a and 41b can be made narrow.

Figure 5:
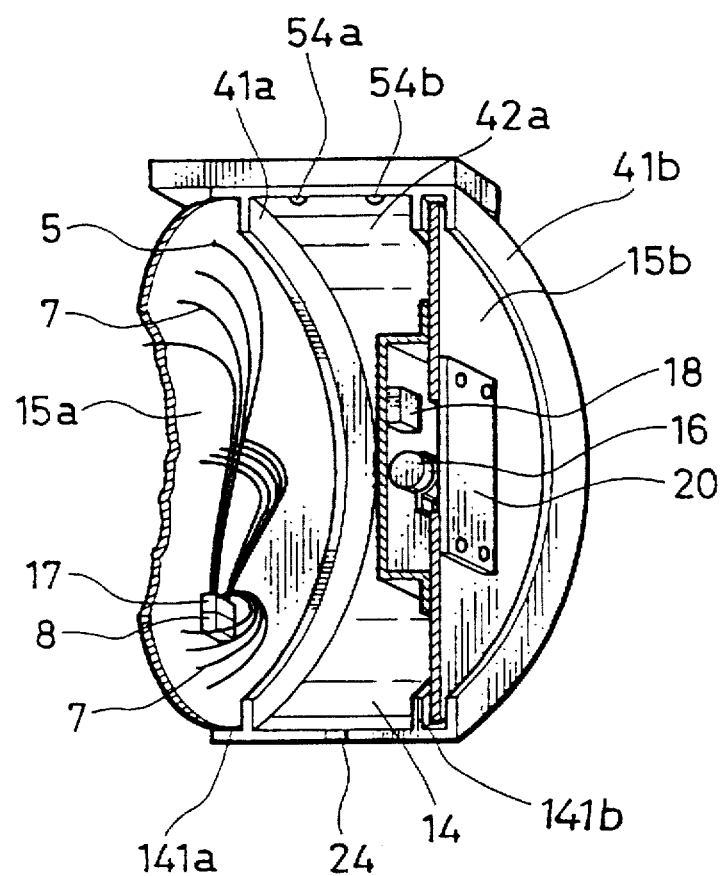
FIG. 5 is a perspective view of the self-light-emitting indicating apparatus shown in FIG. 4, cut along the line X—X.

The same applies to the first and second panels 15a and 15b fixed on the first and second support members 41a and 41b shown in FIG. 5. The first and second support members 41a and 41b of FIG. 2 and the first and second panels 15a and 15b of FIG. 5 may generally referred to as first and second holding plates.

Figure 15:
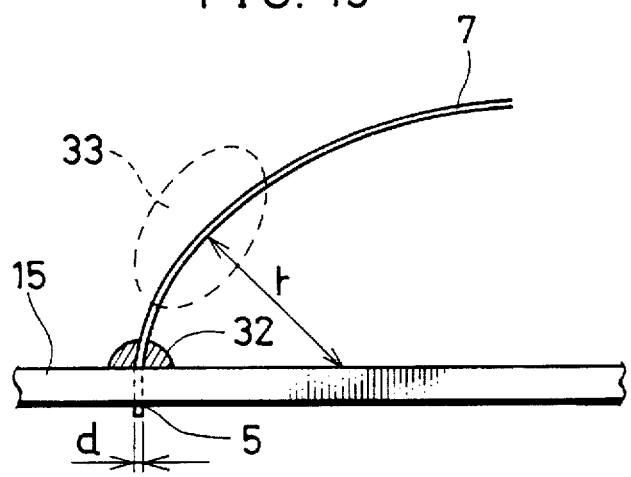
FIG. 15 shows one modification of the optical leakage preventing apparatus in accordance with the fifth embodiment of the present invention.

FIG. 15 shows a modification of the self-light-emitting indicating apparatus of the present embodiment. FIG. 15 shows a partial cross section of the first and second panels 15a and 15b fixed on the first and second support members 41a and 41b of FIG. 5, in accordance with the modification. An optical fiber 7 is inserted through a through-hole 5 of the panel 15, epoxy resin adhesive 32 prepared by mixing a main agent and a hardener is applied, and then by using a hair dryer, hot forced air of about 80° C. to 90° C. is blown for about 1 minute to the portion of the optical fiber inserted in the through-hole 5 and bent portion 33 of the optical fiber.

When the optical fiber is formed of acryl, it is necessary to bend the optical fiber with the curvature of 100d<r at a room temperature, where d represents the diameter and r represents radius of curvature of the optical fiber.

However, by heat treatment performed in the present invention, degradation of optical characteristics of the optical fiber (acryl), that is, light transmittance, refractive index and so on, caused by strain and stress generated at the bent portion can be prevented, and at the same time, degradation of mechanical characteristics can also be prevented. Therefore, the optical fiber can be bent with the curvature of 70d≦r<100d. Further, the time of hardening of the epoxy resin used for adhesion can be reduced.

Figure 16:
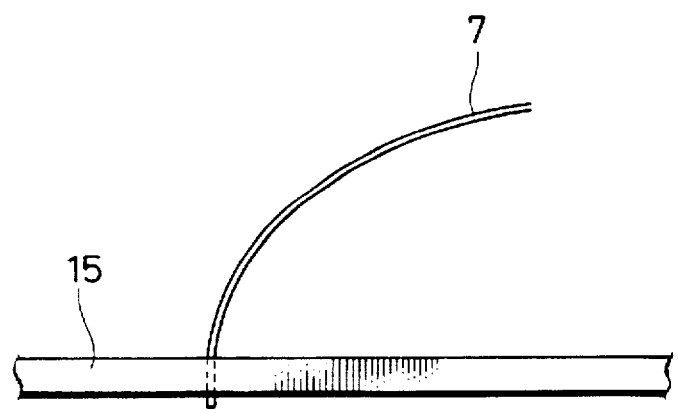
FIG. 16 shows another modification of the optical leakage preventing apparatus in accordance with the fifth embodiment of the present invention.

FIG. 16 shows another modification of the present embodiment. The example of FIG. 16 is approximately the same as that of FIG. 15, except that the optical fiber 7 is heated and kept at the heated temperature 40° C. to 50° C for about 1 minutes in advance so as to shape the fiber, and then the optical fiber 7 is inserted to the through hole 5.

Figure 17A:
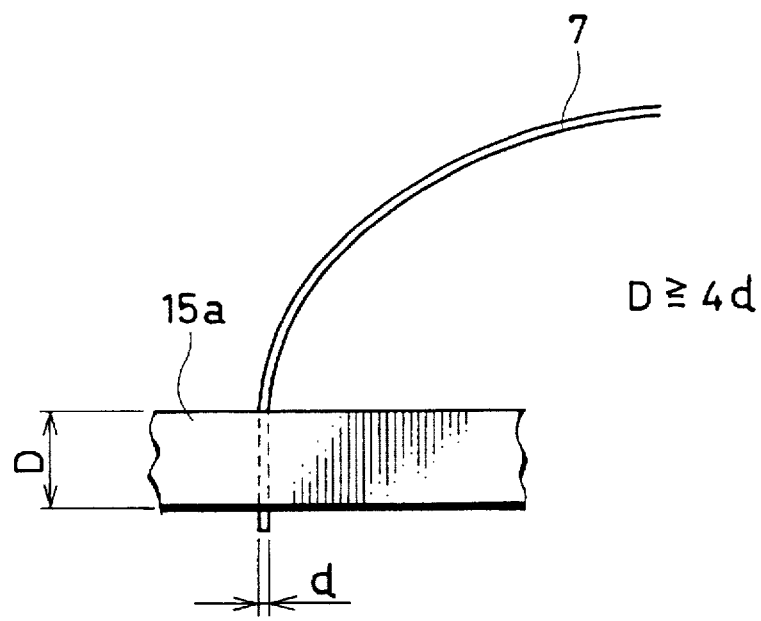
FIG. 17A shows a concept of still another modification of the optical leakage preventing apparatus in accordance with the fifth embodiment of the present invention.
Figure 17B:
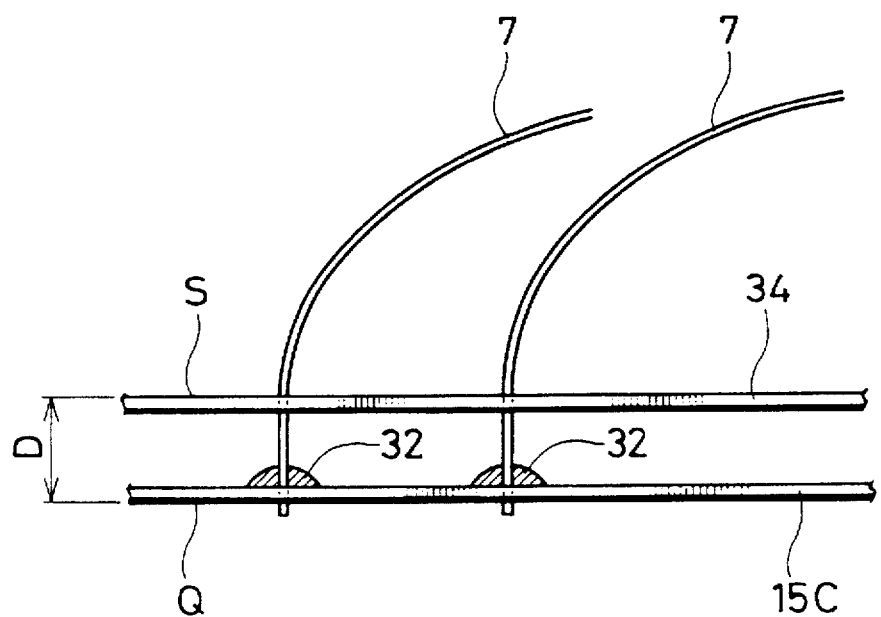
FIG. 17B shows said modification of the apparatus.

A still further modification of the present embodiment will be described with reference to FIGS. 17A and 17B. FIG. 17A shows a state in which optical fiber 7 is inserted into the first panel 15a of FIG. 5. Generally, the relation D≧4d must be satisfied to fix the optical fiber at a prescribed angle as shown in FIG. 17A, where D represents the thickness of the panel (or holding plate) and d represents the diameter of the optical fiber. In this modification, the relation D≧4d only has to be satisfied, where D represents distance from an outer surface Q of panel 15c to an outer surface S of auxiliary plate 34 and d represents the diameter of the optical fiber.

FIG. 19 is a partially exploded cross section of the self-light-emitting indicating apparatus in accordance with another embodiment of the present invention. More specifically, FIGS. 19A, 19B, and 19C show the manner of assembly of tubular body 42, optical fiber 7 and lid 43. In this embodiment, the tubular body 42 of FIG. 2 and first and second support members 41a and 41b of FIG. 2 are formed integrally, and the tubular body 42 is extended as it is to provide extended portions 38a and 38b. The extended portions 38a and 38b are little protruded from the protruded ends of optical fiber 7. Further, the lid 43 is also protruded, with a little wider width, from the protruding end of optical fiber 7, as the extended portions 38a and 38b. By virtue of this structure, the protruded ends of optical fiber 7 are not damaged, since they are protected by the extended portions 38a and 38b of the tubular body 42 as well as by the widened portion of the lid 43, even when the self-light-emitting indicating apparatus falls down.

Figure 20:
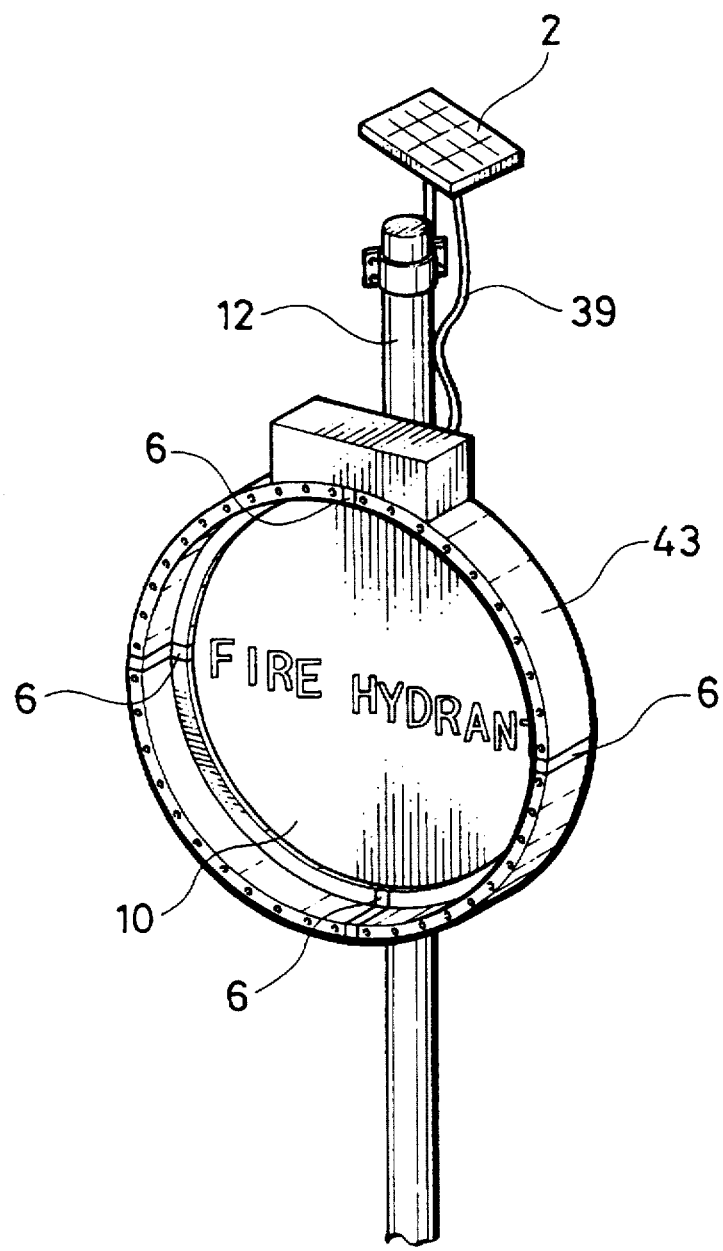
FIG. 20 is a partial perspective view of the self-light-emitting indicating apparatus in accordance with a still further embodiment of the present invention.

FIG. 20 is a partial perspective view of the self-light-emitting indicating apparatus in accordance with a still further embodiment of the present invention. In this embodiment, the solar cell holder 2 attached to the lid 43 of FIG. 1 is attached on an upper end of a pole 12 which is separate from the self-light-emitting indicating apparatus, by extending a lead 39, and metal fitting 6 is provided inside the tubular body 42.

As described above, according to various embodiments of the present invention, an indicating apparatus is fabricated by using a small number of light emitting diodes, acryl optical fibers having tip ends adjacent to the diodes and optical leakage preventing means, so that compared with the conventional method of point light sources of light emitting diodes, optical energy can be transmitted efficiently, and lighting points can be provided in a wide range along characters, symbols or the periphery of the sign board by means of the optical fibers. Therefore, the effect of improving visibility is remarkable, and in addition, power consumption can be significantly reduced.

Since the light reflecting member is provided around the light emitting diode or electroless plating is performed on the light emitting diode, optical losses can be suppressed.

Further, as the optical fibers are arranged crossing with each other and optical fibers are subjected to heat treatment, the optical fibers can be bent at the curvature of 70d≦r<100d, which is far larger than usual, while not impeding mechanical characteristics and physical characteristics such as light transmittance, refractive index or the like. Therefore, the space between opposing panels can be narrowed, and the apparatus can be made compact. Further, by the heat treatment, the time necessary for hardening the epoxy resin used for adhesion can be reduced.

Further, since an auxiliary plate is attached at a prescribed distance on the holding plate for attaching the optical fibers, the material can be saved and the weight can be reduced.

Further, since at least one of the lid and the extended portion of the tubular body is set to be little protruded from one end of the optical fiber protruding from the through-hole of the support member, the tip end of the optical fiber may not be damaged even when the self-light-emitting indicating apparatus falls down.

In the self-light-emitting indicating apparatus in accordance with a further embodiment, since a draining hole is provided at a lower portion of the enclosure of the self-light-emitting indicating apparatus, rain drops or the like do not gather.

Further, by making lead very long, the solar cell can be placed at an arbitrary position, for example, on a fixed body provided close to the self-light-emitting indicating apparatus in advance, so as to enable most efficient reception of the sunlight.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-light-emitting indicating apparatus, comprising:
   (a) an enclosure formed by combining a pair of semi-tubular bodies opposite each other, each said semi-tubular body having first and second support members which are arranged opposite each other and arranged inwards at both side ends of said semi-tubular bodies;
   (b) a first panel fixed on said first support member of the enclosure having a sign indicating portion;
   (c) a second panel fixed on said second support member of said enclosure;
   (d) a container portion formed by said enclosure and said first and second panels;
   (e) a plurality of optical fibers contained in said container portion, each having one end inserted and fixed in one of a plurality of through-holes provided in at least one of said first and second panels, the plurality of through-holes through which each of the optical fibers are inserted are arranged surrounding a group of characters displayed on the sign indicating portion;
   (f) a light emitting diode contained in the container portion, arranged adjacent to another end of said plurality of optical fibers which are bundle and cut, and having optical leakage preventing means;
   (g) a power source for the light emitting diode; and
   (h) a fitting means attached to one of said enclosure and said second panel and fixed to said one of said enclosure and said second panel.

2. The self-light-emitting indicating apparatus according to claim 1,
   wherein said leakage preventing means of said light emitting diode consists of electroless plating performed on a side surface of said light emitting diode.

3. The self-light-emitting indicating apparatus to claim 2, wherein
   said power source is a solar cell mounted on a solar cell holder provided on one of said lid and a support member.

4. The self-light-emitting indicating apparatus according to claim 1,
   wherein said optical leakage preventing means of said light emitting diode includes
   a holder formed of a synthetic resin including a light reflecting member on an inner peripheral surface of a through-hole, a plurality of optical fiber bundles fixed by means of an adhesive in the through-hole, and the light emitting diode inserted and fixed in the through-hole at a position opposing to and spaced apart by a prescribed small distance for light diffusion from, edges of the optical fiber bundles are inserted and fixed in said through-hole.

5. The self-light-emitting indicating apparatus according to claim 1,
   wherein said optical leakage preventing means of said light emitting diode includes
   a fiber holder formed of a synthetic resin having at least one through-hole; a plurality of optical fiber bundles inserted and fixed in the through-hole; a light emitting diode holder formed of a synthetic resin having at least one through-hole provided at a position opposite edges of the optical fiber bundles inserted and fixed in said through-hole of the fiber holder, and having a light reflecting member on an inner peripheral surface of the through-hole; a light emitting diode inserted and fixed in the through-hole of the light emitting diode holder; and fixing means for clamping said fiber holder and the light emitting diode holder.

6. The self-light-emitting indicating apparatus according to claim 1, wherein
   said power source is a solar cell mounted on a solar cell holder provided on and said enclosure or on said second panel.

7. A self-light-emitting indicating apparatus according to claim 1, further comprising:
   a detachment hole provided at said second panel for exchanging a storage battery contained in said container portion, wherein said fitting means is positioned opposite said detachment hole.

8. The self-light-emitting indicating apparatus according to claim 1, wherein
   a storage battery and a circuit for flickering are contained in said container portion.

9. The self-light-emitting indicating apparatus according to claim 1, wherein
   a draining hole is provided at a lower portion of said enclosure.

10. A self-light-emitting indicating apparatus, used for attracting attention to a sign, comprising:
    (a) an enclosure having first and second support members arranged at opposing ends of a tubular body and having a plurality of through-holes;
    (b) a recessed container portion formed by said enclosure and said first and second support members;
    (c) a plurality of optical fibers contained in said recessed container portion and each having one end inserted and fixed in each of said plurality of through-holes of at least one of said first and second support members, the plurality of through-holes through which each of the optical fibers are inserted are arranged surrounding a group of characters displayed on the sign;
    (d) a light emitting diode contained in said recessed container portion, arranged adjacent to the other end of said fiber and having optical leakage preventing means;
    (e) a power source for the light emitting diode;
    (f) a lid for covering said recessed container portion; and
    (g) a fitting means attached on one of said lid and said enclosure for fixing said one of said lid and said enclosure.

11. The self-light-emitting indicating apparatus according to claim 10,
    wherein the optical leakage preventing means of said light emitting diode consists of electroless plating performed on a covered side surface of said diode.

12. The self-light-emitting indicating apparatus according to claim 10,
    wherein said optical leakage preventing means of said light emitting diode includes
    a holder formed of a synthetic resin having a light reflecting member on an inner peripheral surface of a through-hole; a plurality of optical fiber bundles adhered and fixed by an adhesive in said through-hole; and a light emitting diode inserted and fixed in said through-hole at a position opposing to and spaced apart by a prescribed small distance for light diffusion from, edges of the optical fiber bundles inserted and fixed in said through-hole.

13. The self-light-emitting indicating apparatus according to claim 10, wherein said optical leakage preventing means of said light emitting diode includes a fiber holder formed of a synthetic resin having at least one through-hole; a plurality of optical fiber bundles inserted and fixed in the through-hole; a light emitting diode holder formed of a synthetic resin having at least one through-hole at a position opposite edges of the optical fiber bundles inserted and fixed in said through-hole of the fiber holder, and having a light reflecting member on an inner peripheral surface of the through-hole; a light emitting diode inserted and fixed in the through-hole of said light emitting diode holder; and fixing means for clamping said fiber holder and said light emitting diode holder.

14. The self-light-emitting apparatus according to claim 10, wherein a storage battery and a circuit for flickering are contained in said solar cell holder.

15. The self-light-emitting indicating apparatus according to claim 10, wherein said lid one of said and said enclosure is detachably attached to an attachment arm of an existing fire hydrant sign board by means of said fitting means.

16. The self-light-emitting indicating apparatus according to claim 1 or 10, wherein the optical fiber is bent at a curvature of $70d \leq r < 100d$, by means of heat treatment, where d represents diameter of said optical fiber and r represents a radius of curvature of the optical fiber.

17. The self-light-emitting indicating apparatus according to claim 10, wherein at least one of a portion extending from said tubular body and said lid is set to protrude a small amount from one end of the optical fiber protruded from the through-hole of said support member.

18. The self-light-emitting indicating apparatus according to claim 10, wherein a draining hole is provided at a lower portion of said enclosure.

19. A self-light-emitting indicating apparatus, used for attracting attention to a sign, comprising:

(a) an enclosure having a container portion therein and having a plurality of through-holes;

(b) a plurality of optical fibers contained in said container portion and each having one end inserted and fixed in each of said plurality of through-holes of said enclosure, the plurality of through-holes through which each of the optical fibers are inserted are arranged surrounding a group of characters displayed on the sign;

(c) a light emitting diode contained in said container portion, arranged adjacent to the other end of said fiber and having optical leakage preventing means;

(d) a power source for the light emitting diode; and (e) a fitting means for fixing said enclosure to an existing sign board.

20. The self-light-emitting indicating apparatus according to claim 19, wherein the optical leakage preventing means of said light emitting diode is electroless plating performed on a covered side surface of said diode.

21. The self-light-emitting indicating apparatus according to claim 19, wherein said optical leakage preventing means of said light emitting diode includes a holder having a light reflecting member on an inner peripheral surface of a through hole; a plurality of optical fiber bundles fixed in said through hole; and a light emitting diode inserted and fixed in said through hole at a position opposing to edges of the optical fiber bundles inserted and fixed in said through hole.

22. The self-light-emitting indicating apparatus according to claim 19, wherein said optical leakage preventing means of said light emitting diode includes a fiber holder having at least one through hole; a plurality of optical fiber bundles inserted and fixed in the through hole; a light emitting diode holder having at least one through hole at a position opposing to edges of the optical fiber bundles inserted and fixed in said through hole of the fiber holder, and having a light reflecting member on an inner peripheral surface of the through hole; a light emitting diode inserted and fixed in the through hole of said light emitting diode holder; and fixing means for clamping said fiber holder and said light emitting diode holder.

23. The self-light-emitting indicating apparatus according to claim 19, wherein said enclosure is detachably attached to an attachment arm of an existing sign board by means of said fitting means.

24. The self-light-emitting indicating apparatus according to claim 19, wherein the optical fiber is bent at a curvature of $70d \leq r < 100d$, by means of heat treatment, where d represents diameter of said optical fiber and r represents radius of curvature of the optical fiber.

* * * * *